United States Patent Office 3,133,888

Patented May 19, 1964

3,133,888

PRODUCTION OF SEMICONDUCTOR MATERIALS

Mitsuru Oikawa, Suginami-ku, Tokyo-to, Tadao Okabe, Hachioji-shi, Eiichi Maruyama, Kitatama-gun, Tokyo-to, and Masao Sugawara, Daito-ku, Tokyo-to, Japan, assignors to Kabushiki Kaisha Hitachi Seisakusho, Tokyo-to, Japan, a joint-stock company of Japan Filed May 4, 1961, Ser. No. 107,840
Claims priority, application Japan May 11, 1960
2 Claims. (Cl. 252—501)

This invention relates to semiconductor materials, and more particularly it relates to a new method of producing chalcogen compounds of cadmium.

It is an object of the present invention to provide a new method of producing chalcogen compounds of cadmium which are useful as materials which exhibit nonlinearity in their current-voltage characteristic (hereinafter referred to as nonlinear materials).

It is another object of the invention to provide a new method of producing chalcogen compounds of cadmium which are useful as photosensitive materials.

The manner in which the foregoing as well as other objects and advantages of the invention may best be achieved will be best understood by reference to the following description, taken in conjunction with the accompanying drawings in which.

Figures 1, 2, 3, 4, 5:
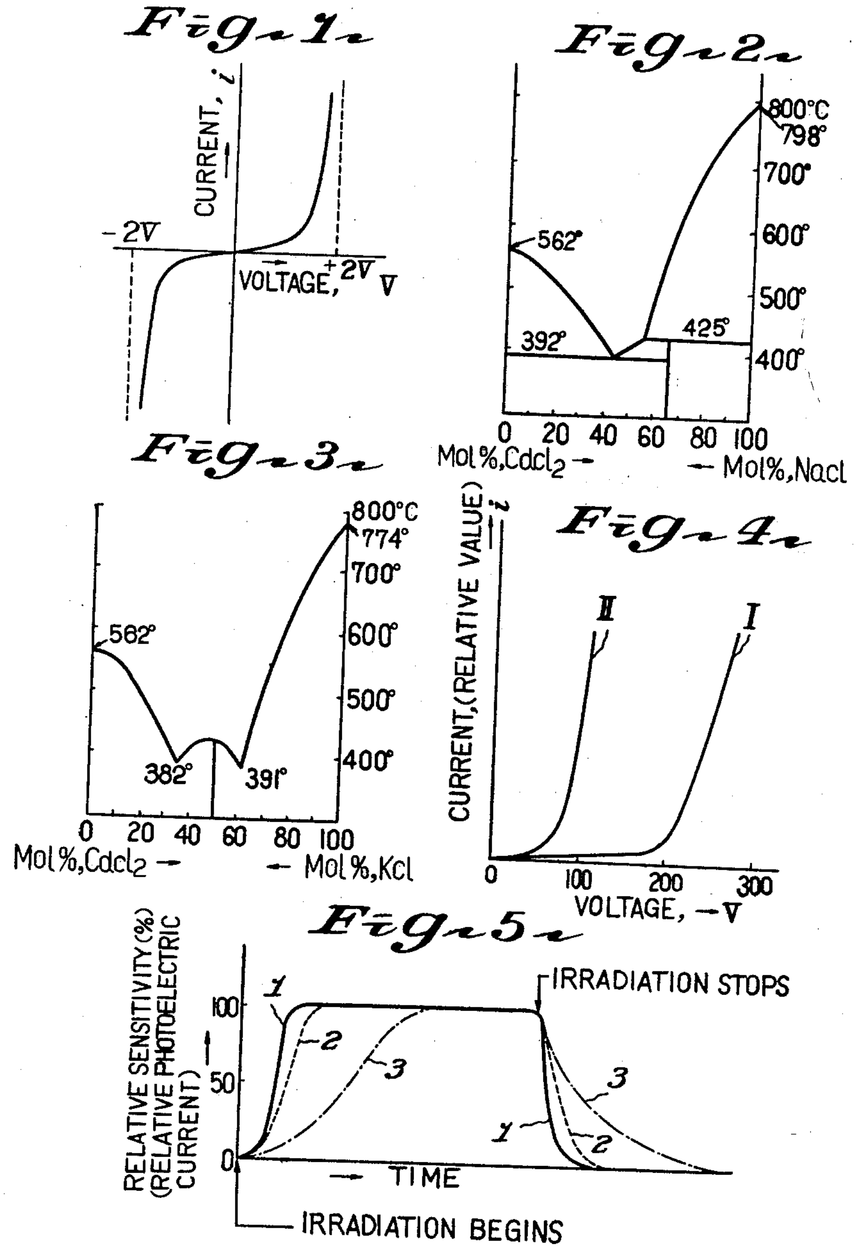
FIGURE 1 is a graphical representation of the current-voltage characteristic produced when a nonohmic electrode is attached to a cadmium sulfide monocrystal into which chlorine has been introduced.
FIGURE 2 is a phase diagram of a mixture of cadmium chloride and sodium chloride.
FIGURE 3 is a phase diagram of a mixture of cadmium chloride and potassium chloride.
FIGURE 4 is a graphical representation of the current-voltage characteristics of nonlinear materials produced by the method of the present invention and by a conventional method.
FIGURE 5 is a graphical representation of the response times of photosensitive materials produced by the method of the present invention and by a conventional method.

To obtain a semiconductor for use as a nonlinear material, it is necessary to introduce by a suitable method an electron donor such as a halogen element into a chalcogen compound of cadmium to form a semiconductor with an excess of N type impurity.

For example, if chlorine is introduced into a monocrystal of cadmium sulfide, a nonohmic electrode is attached to each end of this crystal, and the current-voltage characteristic thereof is measured, the current will be found to increase suddenly in a nonlinear manner just when the voltage exceeds approximately one volt as indicated in FIG. 1. This nonlinear variation of the current-voltage characteristic is thought to be due to the interface electric potential barrier existing in the interface of the aforesaid crystal.

While the above case is that of a monocrystal of cadmium sulfide into which chlorine is introduced, a similar nonlinearity in the current-voltage characteristic is observable also in the case wherein microcrystals of cadmium sulfide into which chlorine has been introduced are made, imbedded in a dielectric such as a synthetic resin, and disposed between a pair of electrodes, the said nonlinearity being caused by the interface electric potential barrier existing in the interfaces of the said resin and cadmium sulfide crystals. In such a case, the value of the voltage which causes a bend in the current-voltage characteristic curve depends on the number of interfaces existing in the gap between the electrodes. For this reason, in the case wherein it is required to cause this voltage created by the said bend (hereinafter referred to as the bend voltage) to be as high as possible with respect to the unit gap length of the electrodes, it is necessary to use halogen activated cadmium sulfide particles which are as fine as possible so as to make the number of interfaces existing between the electrodes as large as possible.

Heretofore, such nonlinear materials as afore-mentioned have been produced as described below. First, a pulverized, amorphous chalcogen compound of cadmium is made by a suitable method. Next, a mixture of suitable proportions of this amorphous chalcogen compound powder of cadmium and a metallic chloride, a so-called flux, is heated and baked at a suitable temperature above the melting point of the said flux in a suitable atmosphere. Then the said flux is removed by such a method as water washing, whereupon microcrystals of chalcogen compound of cadmium with excess N type impurity are obtained.

Heretofore, cadmium chloride, sodium chloride, or a similar halide has been used singly as a flux such as that afore-described. When cadmium chloride is used, baking is ordinarily accomplished at approximately 600° C. since its melting point is 562° C.; and when sodium chloride is used, baking is accomplished at approximately 900° C. since its melting point is 798° C. For example it has been found as a result of experiments that the greater portion of microcrystals of cadmium sulfide into which chlorine has been introduced which have been produced with the use of the aforesaid flux is composed of crystalline particles of 10-micron size or larger in the case of cadmium chloride and of 5-micron size or larger in the case of sodium chloride.

Furthermore, in order to obtain chalcogen compounds of activated cadmium as photosensitive materials, it is necessary to introduce suitable quantities of activated impurities such as copper, silver, and chlorine, by a suitable method, into these compounds. The conventional method practiced heretofore of introducing such impurities has comprised heating and calcining a mixture of suitable proportions of a chalcogen compound of cadmium, salts of copper or silver, and a metallic halide such as cadmium chloride, as a so-called flux, at a temperature above the melting point of the said flux in a suitable atmosphere, then removing the said flux by a method such as water washing to obtain an activated chalcogen compound of cadmium.

However, in this case also, similarly as in the case of the aforesaid nonlinear material, a metallic halide such as cadmium chloride is used singly as a flux such as that aforedescribed, and the crystals of the activated chalcogen compound of cadmium which are obtained as a result have grain sizes which are of the same order as those in the case of the aforementioned nonlinear material.

Moreover, in the activation and calcining of cadmium sulfide, the use of flux of lower melting point will result in a more rapid response speed since, owing to the nature of crystal growth, the creation of the shallow captured center of the electrons is suppressed. That is, the use of cadmium chloride (melting point: 562° C.) rather than sodium chloride (melting point: 798° C.) and calcining at a lower temperature will shorten the response time to a fraction. However, cadmium sulfide crystals which have been calcined with cadmium chloride as a flux have grain sizes which are still excessively large. They are particularly excessively large and unsuitable for use in the making of such parts as photoconductive surfaces. Therefore, an even finer grain size is required.

In view of the above-described considerations, the method of the present invention, differing from the heretofore known methods, makes use of a mixture flux instead of a single flux, whereby the melting point of this mixture flux is lowered, and low-temperature calcining is made possible. At the same time, the crystal growth of the chalcogen compound of cadmium is inhibited by the crystal growth inhibiting action due to the mutual action of the various fluxes, and microcrystals of chalcogen compound of cadmium of nonlinear voltage-current characteristic and average grain size of the order of 1 micron, which is finer than that obtainable by the heretofore known methods, are obtained. Furthermore, a photosensitive material of high response speed is obtained. The method of the present invention is further characterized by the use of a mixture of at least two kinds of halides selected from the group of cadmium, potassium, sodium, magnesium, calcium and the like as the aforesaid mixture flux, the mixture proportions thereof being so selected as to cause the lowering of the melting point of the mixture below the melting point of any of the individual constituent fluxes, whereby calcining is accomplished at a temperature which is lower than that in the case wherein the said constituent fluxes are used singly.

In order to indicate more fully the nature of the present invention, the following examples are set forth, it being understood that these examples are presented as illustrative only, and that they are not intended to limit the scope of the invention.

*Example 1*

Referring to FIG. 2, which is a phase diagram of a mixture of cadmium chloride and sodium chloride, it will be clearly seen that the melting point of the mixture is lower than that of either of the constituent chlorides. Accordingly, by the use of this mixture, it is possible to accomplish calcining at a temperature which is lower than that in the case wherein each flux is used independently.

Now, if a flux composed of 60 mol percent of cadmium chloride and 40 mol percent of sodium chloride is added in the proportion of $\frac{1}{10}$ to $\frac{1}{2}$ mol, in terms of chlorine content, with respect to one mol of amorphous cadmium sulfide, and calcining is carried out at a temperature of 500 to 600° C. in an inert gas, it will be possible to obtain microcrystals of chlorine-introduced cadmium sulfide of an average grain size of the order of 1 micron with a high yield of 90 percent or more.

Chlorine-introduced cadmium sulfide produced in the aforedescribed manner, in one instance with the use of a mixture flux of cadmium chloride and sodium chloride, and in another instance with the use of a single flux of cadmium chloride, was mixed, in each instance, with a resin in the volumetric proportion of 1 to 1 with respect to the resin to form a test specimen. The current-voltage characteristics of the two kinds of specimens, placed between electrodes spaced with a gap therebetween of 300 microns, were as indicated in FIG. 4, wherein the curve I corresponds to the case of the aforesaid mixture flux, and the curve II corresponds to the case of the aforesaid single flux. As is apparent by this graph, the product produced by the method of the present invention exhibits a high bend voltage which is approximately two times that of the product produced by a heretofore known method.

*Example 2*

Referring to FIG. 3, which is a phase diagram of a mixture of cadmium chloride and potassium chloride, it will be clearly seen that low-temperature calcining is made possible in this case also by the mixture, similarly as in the case of Example 1. When low-temperature calcining is carried out with the use of such a mixture flux, microcrystals of chlorine-introduced cadmium sulfide of average grain size of the order of 1 micron are obtainable with high yield similarly as in the case of Example 1.

In Japanese Patent No. 251,311 (patent publication No. 8,873/1958), relating to a screen for phosphorescent representation, it is proposed to insert an impedance layer consisting of a substance which has a nonlinear current-voltage characteristic between electroluminescent layer and a conductor. The extremely fine microcrystals of cadmium sulfide produced by the method of the present invention are effective when used for the above-mentioned purpose.

The method of producing the effectiveness of cadmium sulfide for converting copper and chloride into activated impurities is described hereinunder.

*Example 3*

The melting point of a flux obtained by mixing up to approximately 60 mol percent of sodium chloride with 40 mol percent of cadmium chloride is lower than the melting point of the cadmium chloride. Powder of activated cadmium sulfide which has been calcined with the use of a flux of this compositional range within a temperature range of from 400° C. to 500° C. consists of fine particles of from 1 to 10 microns. While its photoconductive sensitvity is of the same order as that of similar substances made by conventional methods, its responsivity is substantially more rapid than that of substances made by heretofore known methods. This difference is indicated in FIG. 5 and in the following table, the responsivity of the substance made in the above manner is indicated by curve 1 of FIG. 5 and the second column of the following table, and that of a similar substance made by a conventional method with the use of only sodium chloride as the flux is indicated by curve 3 of FIG. 5 and the first column of the following table.

| Flux: Response time | NaCl ms. | $NaCl+CdCl_2$, ms. | $KCl+CdCl_2$, ms. |
|---|---|---|---|
| Rise time (time for photoelectric current to rise 50%) | 300 | 10–50 | 10–50 |
| Attenuation time (time for photoelectric current to decrease to 50%) | 30 | 5–20 | 5–20 |

*Example 4*

When a mixture of potassium chloride and cadmium chloride is used as the flux, an effect similar to that in Example 3 is obtained. The result of using this mixture is indicated by curve 2 of FIG. 5 and the third column in the foregoing table.

While the case of cadmium sulfide has been described above, the invention is not limited to the said case, the use of other chalcogen compounds of cadmium exhibiting similar properties being possible. Moreover, a mixture composed of two or more kinds of halides from among those of cadmium, potassium, sodium, magnesium, calcium, and other similar metals, combined so as lower the melting point, may be used as the flux.

Thus, since many changes can be made in the above described details without departing from the nature and spirit of the invention, it is to be understood that the invention is not to be limited to the details described herein except as set forth in the appended claims.

What is claimed is:

1. A method of producing semi-conductor materials containing a doping agent comprising admixing a quantity as a flux cadmium chloride and a chloride selected from the group consisting of magnesium chloride, calcium chloride, sodium chloride and potassium chloride to cadmium sulfide; each of the two chlorides being in a mol ratio of between 3:2–2:3 and in a quantity of 0.1 to 0.5 mol in halide content with respect to one mol of the cadmium sulfide; then calcining the mixture at a temperature of between 400–600° C., thereafter removing the flux by solvent extraction.

2. A method of producing photosensitive materials containing an activating impurity comprising admixing a quantity as a flux cadmium chloride and a chloride selected from the group consisting of magnesium chloride, calcium chloride, sodium chloride and potassium chloride to cadmium sulfide containing a quantity of a metal selected from the group consisting of copper and silver; each of the two chlorides being in a mol ratio of between 3:2–2:3 and in a quantity of 0.1 to 0.5 in halide content with respect to one mol of the cadmium sulfide; then calcining the mixture at a temperature of between 400–600° C., thereafter removing the flux by solvent extraction.

References Cited in the file of this patent

UNITED STATES PATENTS

| | | |
|---|---|---|
| 2,876,202 | Busanovich et al. | Mar. 3, 1959 |
| 2,958,932 | Goercke | Nov. 8, 1960 |
| 2,986,534 | Beutler | May 30, 1961 |